United States Patent [19]

Borkan

[11] 4,272,687
[45] Jun. 9, 1981

[54] POWER MANAGEABLE CIRCUIT BREAKER

[76] Inventor: William N. Borkan, 3031 Prairie Ave., Miami Beach, Fla. 33140

[21] Appl. No.: 17,776

[22] Filed: Mar. 5, 1979

[51] Int. Cl.³ ............... H01H 3/28; H01H 43/10; H01H 43/24
[52] U.S. Cl. .................. 307/115; 307/131; 307/140
[58] Field of Search ............... 335/20, 69, 173, 175, 335/186; 307/126, 115, 117, 131, 140, 141, 141.4, 141.8, 149; 361/191, 104, 115, 189, 139, 142; 340/309.6, 309.5, 310 R, 310 A; 337/6, 35

[56] References Cited

U.S. PATENT DOCUMENTS

| | | | |
|---|---|---|---|
| 2,057,093 | 10/1936 | Geisslinger | 361/115 |
| 3,599,048 | 8/1971 | Olin | 307/117 |
| 3,766,436 | 10/1973 | Zocholl | 361/94 |
| 3,846,676 | 11/1974 | Ryczek | 307/141.8 |
| 3,958,204 | 5/1976 | Gryctko | 361/104 |
| 4,038,584 | 7/1977 | Tarchalski | 361/104 |
| 4,060,735 | 11/1977 | Pascucci | 340/310 A |
| 4,090,093 | 5/1978 | Thompson | 307/117 |
| 4,101,878 | 7/1978 | Shimizu | 340/310 R |
| 4,104,541 | 8/1978 | Jewell | 307/141 |
| 4,110,632 | 8/1978 | Wyland | 307/117 |
| 4,124,835 | 11/1978 | Cahill | 361/104 |

Primary Examiner—L. T. Hix
Assistant Examiner—Stafford D. Schreyer
Attorney, Agent, or Firm—Leitner, Palan, Martin & Bernstein

[57] ABSTRACT

A single circuit breaker housing containing a circuit breaker to disconnect the line terminal from the load terminal for a current overload and means to disconnect and reconnect the line terminal from the load terminal for power management. The power management means, activated by an internal or external timer or remote modulated signal, may include a switch in series with circuit breaker contacts or fusible element or electromechanical device to set and reset the circuit breaker contacts. The external timer or other remote activation signals are provided via external terminals on the housing or via a wireless or powerline modulated signal. Electro-optical isolator functionally interconnects and electrically isolates the power management means and the circuit breaker.

49 Claims, 22 Drawing Figures

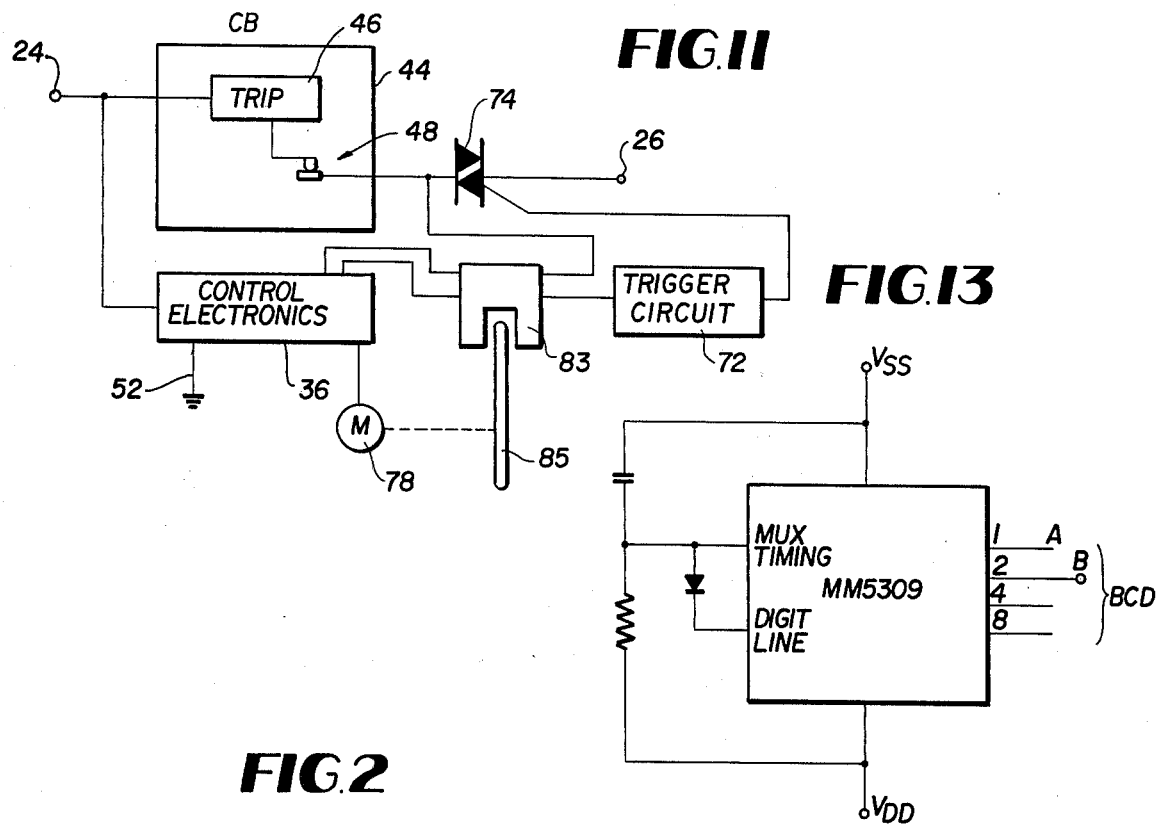
FIG.11
FIG.13
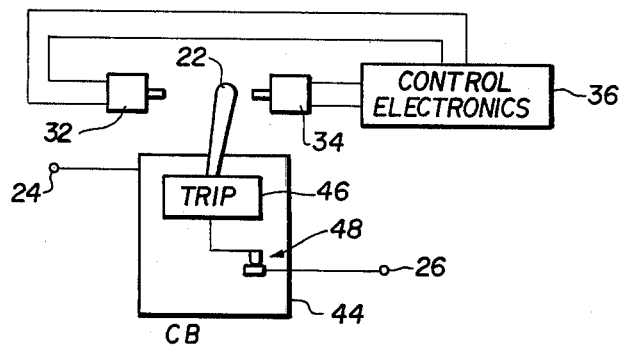
FIG.2
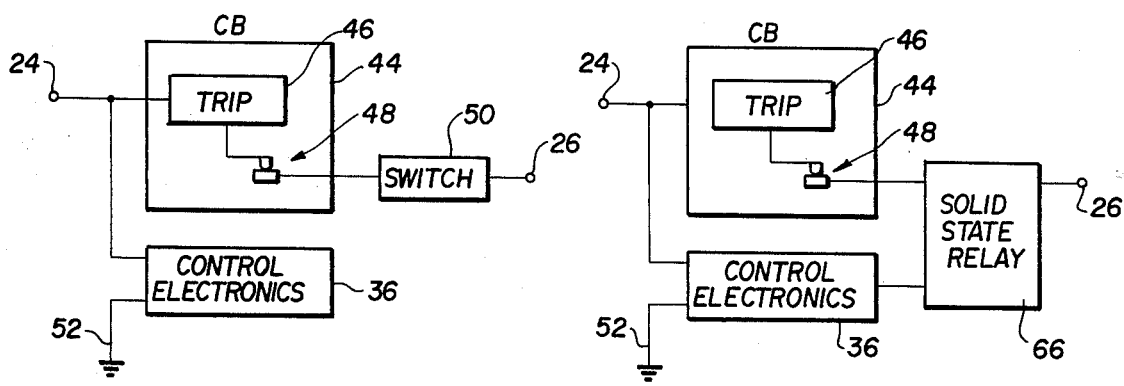
FIG.3  FIG.5

FIG.6
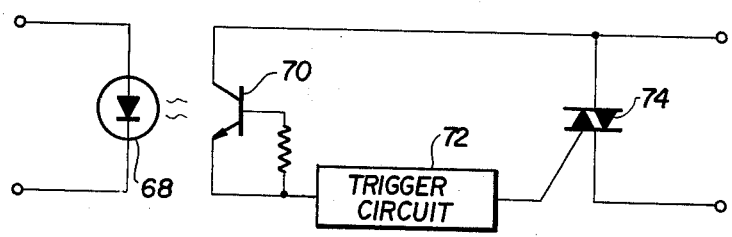
FIG.15
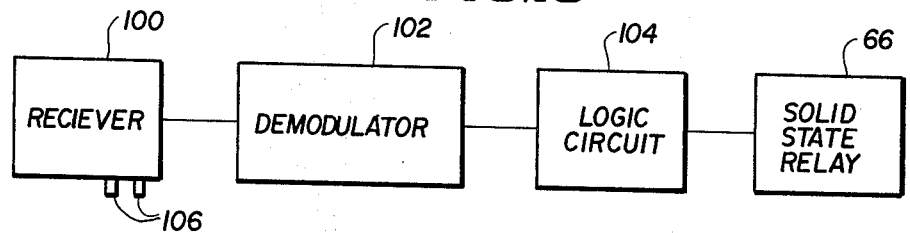
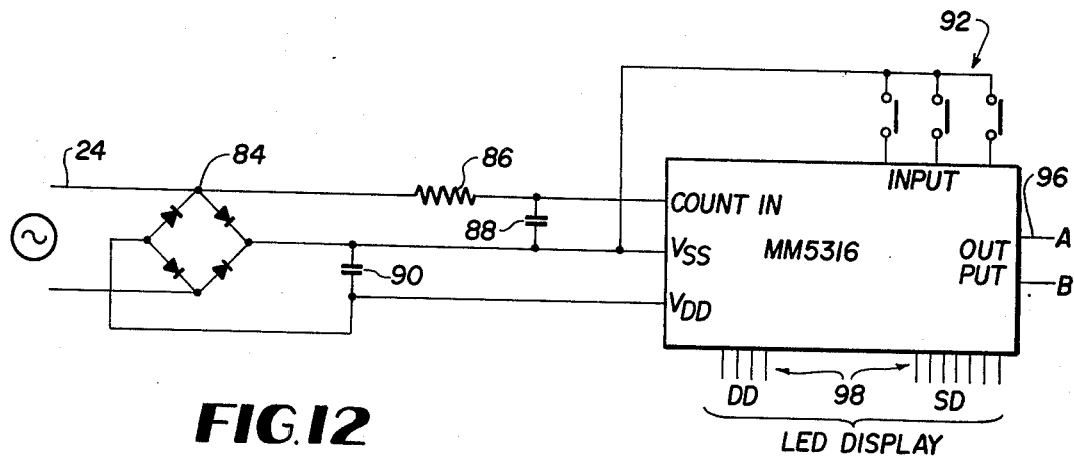
FIG.12
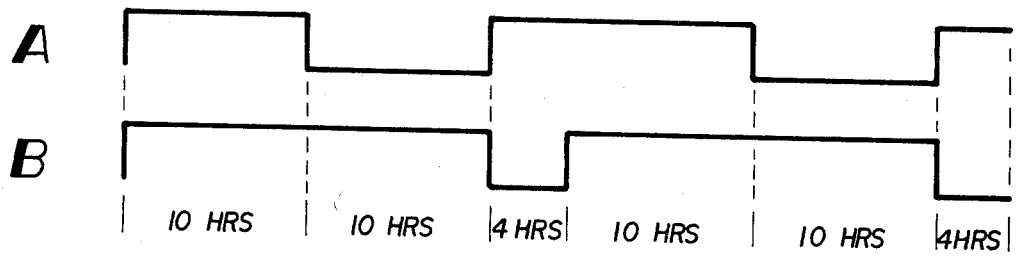
FIG.14

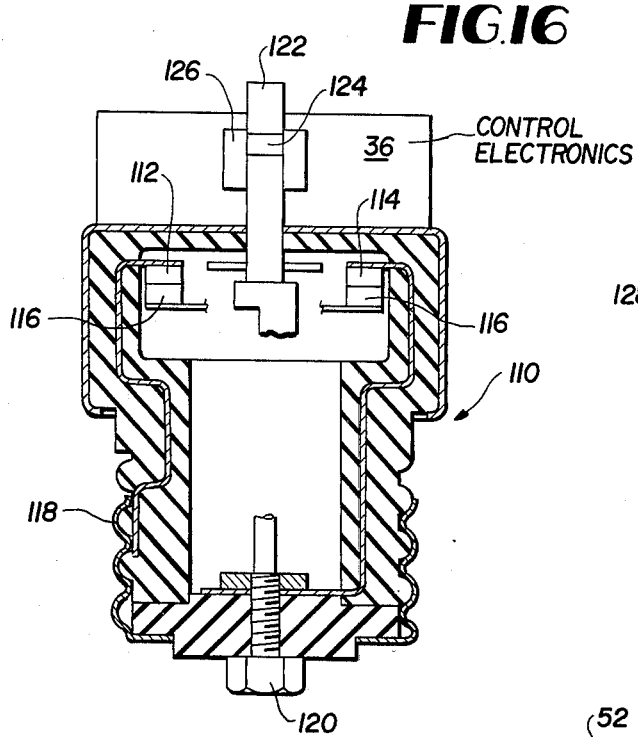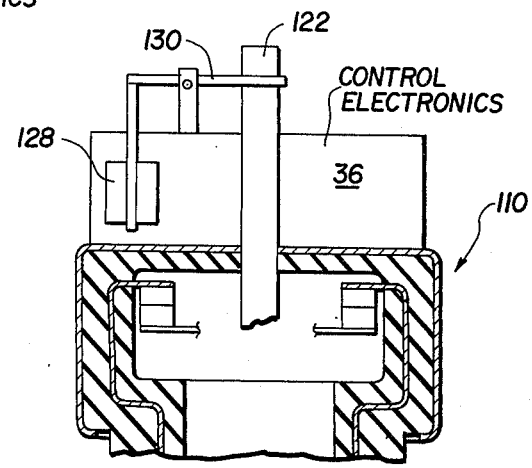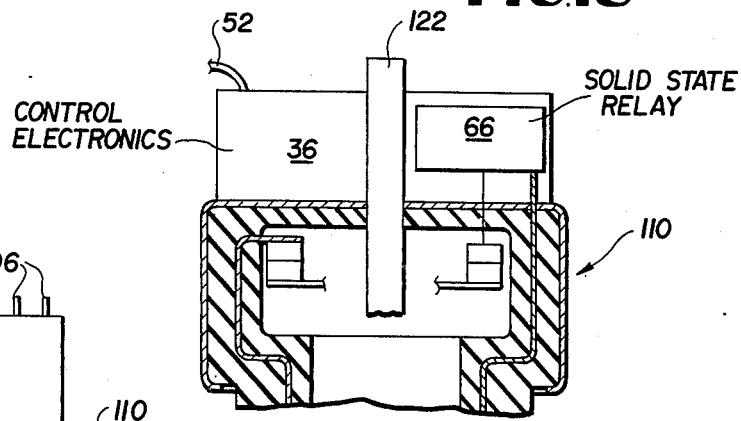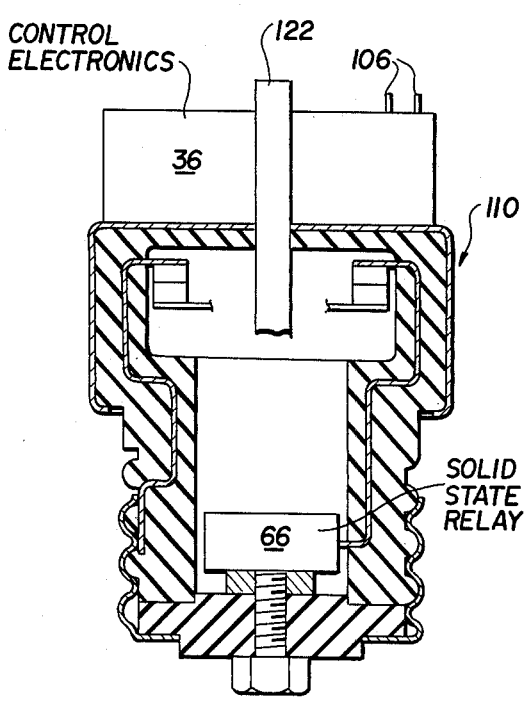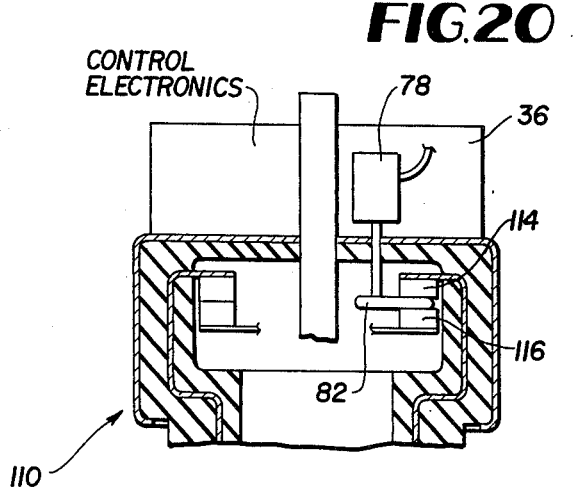

POWER MANAGEABLE CIRCUIT BREAKER

BACKGROUND OF THE INVENTION

The present invention relates generally to power controllers and more specifically to a power controller integrated within a circuit breaker housing.

Utilities are being forced to design and construct new power plants to provide additional capacity to meet their rising peak demand requirements. In an effort to lower peak demand, many utilities have turned to remote load management for many of their smaller users (particularly individual homes). It has been proven by various utility tests that the peak demand can be significantly shifted by controlling the major appliances in many homes. One of the main reasons that this has not become more popular is that the devices presently used for remote control are costly and require an electrician to install. By using these devices to reduce peak demand, utilities are often able to delay the construction of additional capacity and to more efficiently use their available capacity.

One of the largest costs involved with installing an energy management system into a commercial or industrial building is the central wiring that must be run to each load. By using a power managing circuit breaker, these wiring costs are eliminated and the expense of installing an energy management system becomes very low.

Mechanical and electronic timers for controlling the on and off cycles of electronic appliances are well known. These are specifically used when people are not home to give the appearance to a burglar that a house is occupied by turning lights and other devices on and off at the proper time. These generally include a device which is mounted between the wall receptacle and the device to be turned on and off. More sophisticated systems have been used which include placing the timer in the main power line so that a plurality of loads may be turned on and off. An example of this type of system is shown in U.S. Pat. No. 3,833,319.

The prior art has failed to recognize the desirability of providing a timer in the housing with a circuit breaker to provide power management of controllable loads. The timer circuits used to prevent burglary are not used on a regular basis and, consequently, the incorporation permanently into a circuit breaker would not be considered. Thus, there exists a need for a power controller which is readily incorporated into a circuit breaker such that it can be installed without major modification to the system.

SUMMARY OF THE INVENTION

The present invention provides a power managing circuit breaker in a single housing which is installed using the standard insulation for the circuit breaker. A power managing circuit breaker includes a circuit breaker having a pair of contacts or a fuse which provide an open circuit in response to the occurrence of a current overload and also includes in the same housing a managing device which provides an open circuit and resets to a closed circuit in response to independent control signals. The managing device may include a timer to produce the independent control signal or a demodulator to receive modulated control signals from an external timer or other source via the power line, external terminals or via wireless means to produce the independent control signals. The internal timer may be operated by a battery interior to the housing or may include an external lead to connect the timer circuit to ground to complete a circuit in series with the hot line connection of the circuit breaker.

For circuit breakers with external manual operators, the managing device may include an electromechanical actuator to manipulate the manual operator. For a pivotal manual operator, the actuator may be a pair of opposed solenoids to respectively trip and reset the circuit breaker. For a linear manual operator, the actuator also may be solenoid manipulating the manual operator or an inductor manipulating a magnetic portion of the linear manual operator. For a circuit breaker with contacts, the managing device may include a motor driven cam or disc to open and close the circuit breaker contacts or electromagnetics to open and close the contacts by a magnetic force.

Alternatively, the managing device may include a switch in series with the circuit breaker contacts or fusible element which provides an open or closed circuit in response to the independent control signal. The switch may include a pair of contacts or a solid state switch or relay, for example, an optoisolator. For managing devices using the circuit breaker power line as the power source, the optoisolator is important to isolate the control circuit from the circuit breaker circuit.

The housing may be generally cylindrical with an external thread, as in a standard fuse or fustat, or generally rectangular, as in a standard resettable circuit breaker. The managing device may be provided in a fuse adapter having internal and external threaded portions to receive a fuse and be received in a fuse circuit breaker panel respectively. An indicator may be provided on the exterior of the housing to indicate the running time of the timing circuit as well as to set the on and off points. The power manageable circuit may be designed for fixed on and off periods or may be provided with an external element which is capable of adjusting the on and off times of the timer circuit.

OBJECTS OF THE PRESENT INVENTION

An object of the present invention is to provide a power management system which is incorporated in a circuit breaker housing.

Another object of the present invention is to provide a timer control circuit for controlling the contacts of a circuit breaker to produce power management.

A further object of the present invention is to provide a power management system which is inexpensive and readily installed by the average consumer.

Still another object of the present invention is to provide a simplified timing circuit which is readily incorporated into a circuit breaker and requires no installation other than the normal installation of the circuit breaker.

A still further object of the present invention is to provide a power management system which is activated by remote control.

Other objects, advantages, and novel features of the present invention will become apparent from the following detailed description of the invention when considered in conjunction with the accompanying drawings.

BRIEF DESCRIPTION OF THE DRAWINGS

FIG. 2 is a schematic block diagram of the device of FIG. 1.

FIG. 3 is a schematic block diagram of another embodiment of the present invention using a series control switch.

FIG. 5 is a schematic block diagram of another embodiment of the present invention using a solid state relay.

FIG. 6 is a schematic of a solid state relay.

FIG. 11 is a schematic block diagram of another embodiment of the present invention using a motor driven optical disc.

FIG. 12 is a schematic of a timer circuit.

FIG. 13 is a schematic of another timer circuit.

FIG. 14, illustrated wave forms for points A and B of FIG. 13.

FIG. 15 is a schematic of signal demodulator circuit.

FIG. 16 is a cross-sectional view of a resettable circuit breaker having a generally cylindrical housing using an inductor incorporating the principles of the present invention.

FIG. 17 is a partial cross-sectional view of the circuit breaker of FIG. 16 using a solenoid and lever.

FIGS. 18 and 19 are partial and full cross-sectional views respectively of the circuit breaker of FIG. 16 using a solid state relay.

FIG. 20 is a partial cross-sectional view of the circuit breaker of FIG. 16 using a motor.

BRIEF DESCRIPTION OF THE PREFERRED EMBODIMENTS

Figure 1:
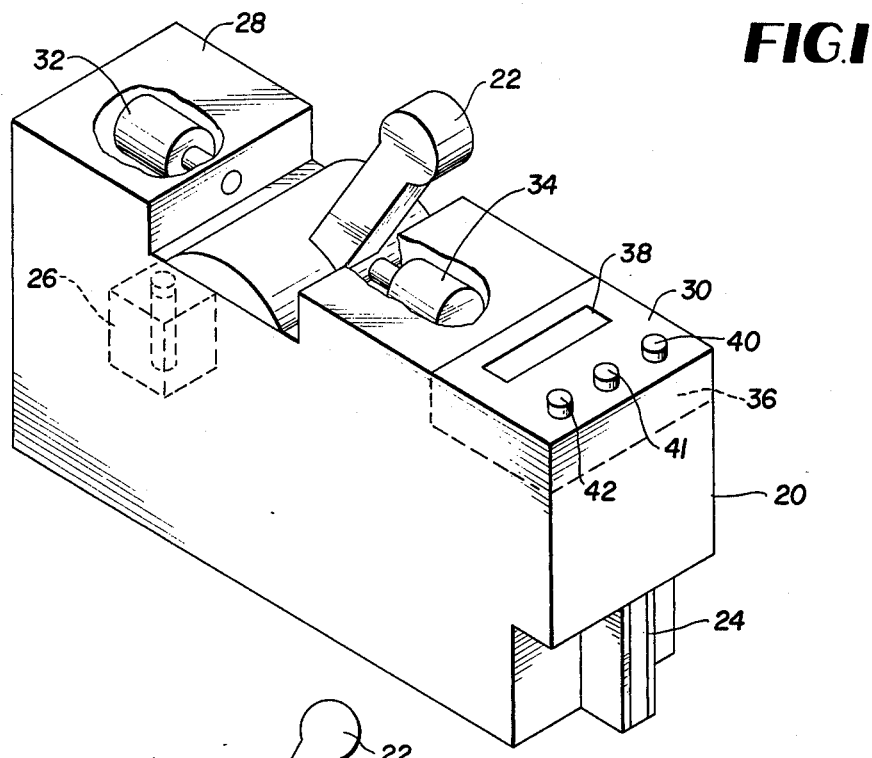
FIG. 1 is a perspective view of a circuit breaker having solenoid controlled operator incorporating the principles of the present invention.

One embodiment of the present invention is the incorporation of a control or energy management circuit or device in a standard rectangular housing of a circuit breaker. This is illustrated in FIG. 1 wherein the housing 20 is rectangular having a manual operating member 22 which controls the condition or the state of a pair of contacts within the circuit breaker (not shown). The pair of contacts may be placed in the open or closed position by the operating member 22. Once closed, the contacts are opened by a current overload through the circuit breaker. This releases an internal latch and forces the contacts open in response to a heavy duty spring or other resilient means. The details of the circuit breaker and specific trip mechanism are not shown since they are not a part of the present invention. Any of the circuit breakers of the prior art may be used. The manual operating member 22, a plug-in line terminal 24 and a wire grip load terminal 26 are illustrated as points of reference. U.S. Pat. No. 2,811,605 is an example of a typical circuit breaker which may be used.

The energy management or control device portion of the present invention is included within the circuit breaker housing 20. Two extensions 28 and 30 of a normal circuit breaker housing 20 are shown, each containing an electromagnetic device or solenoid 32 and 34 therein respectively. The solenoids each include a plunger which operate to manipulate the handle or manual operating member 22 of the circuit breaker. The plungers may be coupled to the manual operating member by the mechanical linkage (not shown) used to gang two or more circuit breakers together. The extention 30 also houses the control electronics 36 and may include a digital display 38 and control buttons 40, 41 and 42. As will be explained more fully, the control electronics 36 for the embodiment illustrated in FIG. 1 may include an integrated circuit internal timer using the technology of the watch industry. This would include a DC source to provide the appropriate timing functions as set by switches 40, 41 and 42 and displayed on display 38.

The operation of the power manageable circuit breaker of FIG. 1 begins with the programming of the timer using switches 40, 41 and 42 to provide the appropriate on and off cycles for the circuit breaker. During normal operation, the circuit breaker operates to monitor the conditions of the line for the current flowing between terminals 24 and 26. Upon the occurrance of an overload, the circuit breaker trips to disconnect the load on terminal 26 from terminal 24. If all conditions are acceptable, the circuit breaker provides a closed circuit between terminals 24 and 26. Upon reaching the selected time, the control electronics 36 activates solenoid 34 to drive or manipulate the manually operated member 22 to open the contacts of the circuit breaker and thereby disconnect the load on terminal 26 from the line current on terminal 24. Once the preset time interval has elapsed, the control electronics 36 operates solenoid 32 to reset the circuit breaker contacts by reversing the position of the manual operating member 22.

The embodiment of FIG. 1 illustrates the incorporation of a DC source timing circuit with a pair of solenoids into the housing of a circuit breaker requiring very little modification of the circuit breaker except for the provision of the extentions 28 and 30. Although a solenoid has been described, an electrothermal linear actuator available from the Actuator Systems Divisions of Gould, Inc. may also be used. Similarly, the time adjustment feature may be deleted. The same embodiment might also be built within a standard circuit breaker housing by making internal modifications to the standard circuit breaker.

The schematic block diagram for the circuit breaker of FIG. 1 is illustrated in FIG. 2 wherein the circuit breaker is illustrated in the box 44 as including a trip mechanism 46 and a pair of contacts 48. The line terminal 24 and the load terminal 26 are connected to circuit breaker 44. The pair of solenoids 32 and 34 are shown on opposing sides of the manual operator 22 and are controlled by the control electronics 36.

Figure 4:
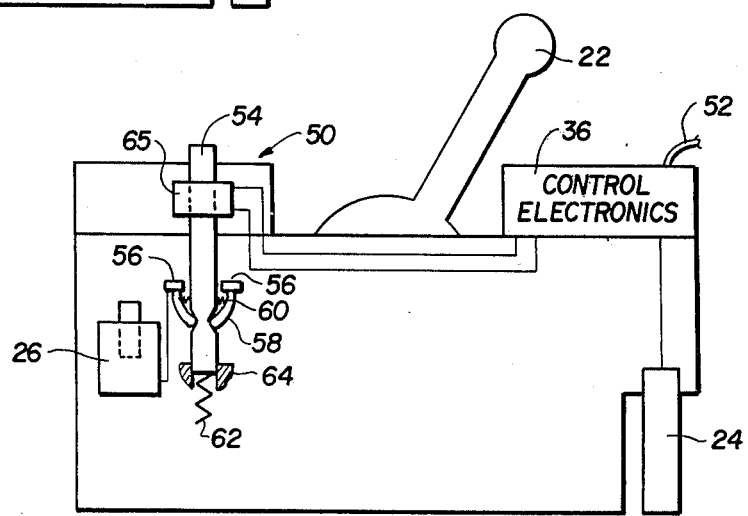
FIG. 4 is a cross-sectional view of a circuit breaker of the schematic of FIG. 3.

Instead of manipulating the operating member 22 of the circuit breaker, the energy management device may include a switch 50 between the load terminal 26 and the circuit breaker 44. Switch 50 is controlled by the control electronics 36 as illustrated in FIGS. 3 and 4.

The control electronics in these two circuits is illustrated as using the AC input from line terminal 24 and includes a ground lead 52 which may be connected at the circuit breaker box. An example of a switch 50, which is under the control of control electronics 36, is illustrated in FIG. 4 and may be, for example, an Otto P1 type switch, available from Otto Control Division of Otto Engineering, Inc., Carpentersville, Ill. The switch 50 includes a plunger 54, pair of contacts 56, spring-loaded bridging contacts 58 including spring 60, plunger spring 62 and stops 64. The switch is shown in the closed position. When the plunger 54 is pulled up, the contacts 58 are forced to a horizontal and then over-center position, so as to provide a snap action down to and on top of the stop 64. By pushing plunger 54 down, the snap action contacts 58 operate in the reverse direction. An inductor 65 is shown surrounding the plunger 54 which may include a magnetic section whose position is controlled by the control electronics 36 via the inductor 65. The plunger 54 would not necessarily extend outside the circuit breaker housing. It should be noted that the switch 50 illustrated in FIG. 4 is an example of the many types of series switches which may be provided in the schematic of FIG. 3. In addition to the mechanical make-break switch, switch 50 may also be a solid state switch circuit.

Figure 7:
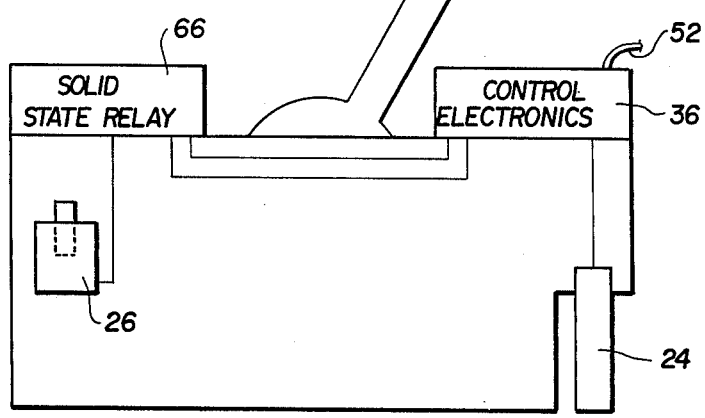
FIG. 7 is a cross-sectional view of a circuit breaker of the schematic of FIG. 5.

FIG. 5 shows an even further schematic wherein the control electronics 36 is connected to a solid state relay 66 which connects the circuit breaker 44 and the load terminal 26. The solid state relay prevents the control electronics 36 from forming a parallel path around the circuit breaker 44. A typical solid state relay 66 is illustrated in FIG. 6 as an optoisolator including a light emitting diode 68 controlling a light responsive transistor 70. A trigger circuit 72 responds to the condition of light responsive transistor 70 to trigger a triac 74. The circuit illustrated in FIG. 6 is a typical solid state relay, for example, the MSR 100 series available from Monsanto. This is but an example of a solid state relay which may be used in the schematic of FIG. 5. By using an optoisolator, the load terminal 26 is effectively isolated from the control electronics 36. One example of a specific location of the solid state relay 66 and electronics 36 in a circuit breaker housing is illustrated in FIG. 7.

Figure 8:
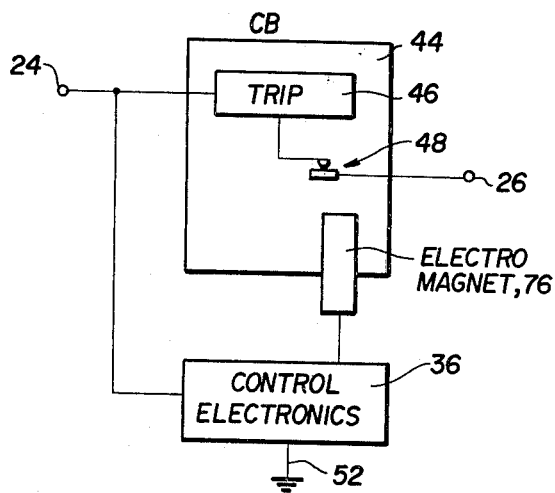
FIG. 8 is a schematic block diagram of another embodiment of the present invention using magnetic forces.
Figure 9:
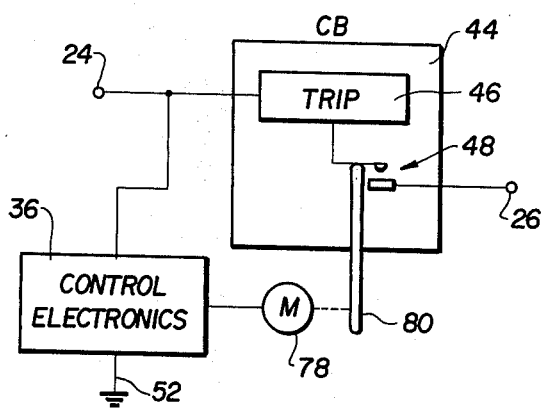
FIG. 9 is a schematic block diagram of another embodiment of the present invention using a motor driven cam.
Figure 10:
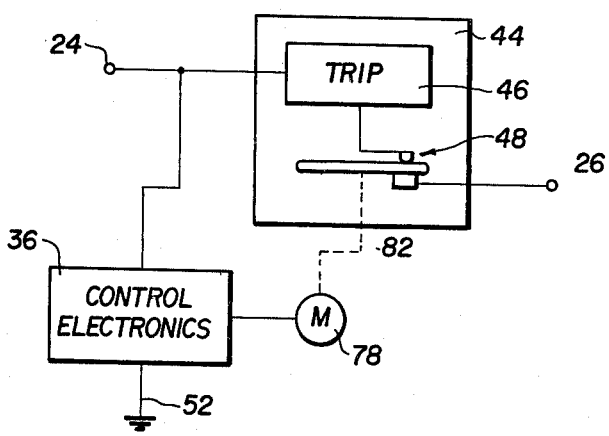
FIG. 10 is a schematic block diagram of another embodiment of the present invention using a motor driven conductive disc.

Another method of providing power management of the circuit breaker is illustrated in FIG. 8 as including an electromagnet 76 operated by the control electronics 36. The electromagnet 76 operates directly on the pair of contacts 48 of the circuit breaker to produce a magnetic field to open the contacts without tripping the trip mechanism 46 of the circuit breaker. Another method of operating directly on the circuit breaker contacts 48 is illustrated in FIG. 9. A motor 78 under the control of the control electronics 36 includes a cam 80 which controls the position of the circuit breaker contacts 48. The cam 80 causes the contacts 48 to separate and come back to a normal set position based on the shape of the cam and the speed of the motor 78. The motor 78 may be a single cycle motor wherein the disc is rotated one revolution and the motor automatically turns itself off. This could provide one cycle of operation and require less sophisticated control electronics 36 to activate the motor for single cycle operation. More sophisticated control electronics 36 may provide direct and continuous control of motor 78. The cam operation of FIG. 9 will not interfere with the trip mechanism 46 of the circuit breaker and thus will not cause any hazard. A third method of operating on the circuit breaker contacts 48 is illustrated in FIG. 10 wherein the motor 78 drives a disc 82 which lies between the pair of contacts 48. By providing appropriately positioned conductive and insulative sections on the disc 82, the time period for the connection and disconnection of the contacts 48 may be determined. As in FIG. 9, the motor 78 may be a single cycle or single revolution motor or may be a motor under the operation of sophisticated control electronics 36.

The motor 78 can also be used to control an electro-optical system. As illustrated in FIG. 11 a slot optical limit switch 83, for example Model MCT8 from Monsanto, is connected in a solid state relay configuration equivalent to the schematic of FIG. 6. A disc 85 having opaque and transparent segments defines the on and off periods in the same manner as the conductive-insulative disc 82 of FIG. 10 by transmitting or blocking light from the light source to the light sensor.

As discussed above, the control electronics 36 may include an internal timer. One commercially available dual point timer and counter is a DF-215 available from Siliconix, Inc. The DF-215 has an oscillator, main counter, digital counter, logic control circuit, logic comparator, input ports and output ports including digital display drive ports. A simpler timer is a model 5402 or 5316 available from National Semiconductor. The 5316 as illustrated in FIG. 12, does not include an oscillator but uses the 60 cycle signal available from the power terminal 24 as the oscillator source. This is provided at the count input. An input circuit includes a full wave rectifier 84, a resistance 86 and capacitors 88 and 90. as noted previously, the resistor 86 and the capacitor 88 provide the count input to the 5316 module. The output of the bridge 84 and capacitor 90 provide two voltage level signals VSS and VDD to the 5316 module. Input switches 92 are provided which set the time and intervals as well as selecting and activating the data to be displayed. The output circuit includes output pins 96 which provide two outputs A and B as control signals at the beginning and ending of the selected period. Additional output 98 provide digital drive signals and segment drive signals for a digital display. The two timing circuits just described are but examples of timing circuits which may be used operating with either AC or DC power supplies. Although the 5316 module of FIG. 12 provides adjustable input for the timing circuit, a less sophisticated timer may be used wherein the timer has a fixed on-off frequency and the beginning of the cycle is determined by when the device is powered up. This would obviously reduce the cost of the control electronics. Such a timing circuit might utilize the common 555 type timer for these less sophisticated applications.

Another control technique which may be used with standard clock integrated circuits uses one or more demultiplexed BCD output lines as a control waveform whose edges determine timer data. In a simple case where, for example, a four hour wide control signal is desired every twenty-four hours, a single diode may be used as shown in FIG. 13 with a MM5309 timer circuit from National Semiconductor. A diode is connected to the ten hour digit using a timer in the twenty-four hour mode and the two BCD output line is selected. When the power is applied, the internal multiplex circuitry will strobe each digit until the digit with the diode connected is accessed. This digit will sink the multiplex charging current and stop the multiplex scanning. Thus, the BCD outputs now present the data from the selected digit. As illustrated in FIG. 14, the output curve A for the units digit is off for ten hours, on for ten hours and off for four hours in a twenty-four hour cycle or mode. The output curve B for the two's digit is off for twenty hours and on for four hours in a twenty-four hour cycle. This and other demultiplexing schemes are described in National Semiconductor Application Note 143, dated November 1975.

The control electronics 36 may not include an internal timer, but instead be a receiver which receives a modulated signal from a remote source and demodulates the same to provide the appropriate control function. FIG. 15 which illustrates a system for handling the modulated signal includes a receiver 100, a demodulator 102, and a level detector or logic circuit 104 driving an output device, for example, solid state relay 66. The receiver 100 may be sensitive to infrared, RF, ultrasonic, subsonic or other wireless type systems or may detect modulation of the line current on terminal 24 or from other wired systems connected to external terminals 106 illustrated in FIG. 15. The demodulator 102 will demodulate the signal be it amplitude modulation, frequency modulation, pulse, PCM or other modulation schemes. The circuits for receiver 100, demodulator 102 and level detector 104 are well known in the art and thus will not be described in specific design depend on the particular carrier of the signals as well as the type of modulation. Unmodulated control signals may also be provided to the external terminals 106 to the control electronics 36 to activate and deactivate the management device through the control electronics which does not include an internal timer or the terminal 106 could be connected in parallel to the internal timer of the control electronics 36 to override the internally generated control signal.

An internal cycle timer may be included in control electronics 36 which is activated or triggered by an external signal to provide a single cycle of operation. The cycle timer for example, a monostable multivibrator, could be activated by a signal on external terminal 106 or by a signal demodulated by the circuit of FIG 15. Thus, a triggerable cycle timer can replaced the more expensive twenty-four clock circuits described in FIG. 12.

The principles of the present invention illustrated for the rectangular circuit breaker housing of FIG. 1 are also applicable to generally cylindrical resettable circuit breaker housings as, for example, that of U.S. Pat. No. 2,514,545. As illustrated in FIGS. 16-20, the circuit breaker 110 includes a housing having a pair of stationary contacts 112 and 114 electrically bridged by a pair of moving contacts 116. The stationary contact 112 is connected electrically to external threaded portion 118 and stationary contact 114 is connected to external base contact 120. Circuitbreaker 110 is threaded to be received in a standard fuse socket. A plunger or manual operator 122 determines the position of the movable contacts 116. The specific details of the spring relationships which cause the tripping, untripping and setting of the contacts 112 as well as its response to current overload is described in U.S. Pat. No. 2,514,545. Since the specific circuit breaker mechanism does not form a part of the present invention, it will not be described in detail. Reference should be made to such patent. The plunger 122 may include a magnetic portion 124 whose position is determined by a coil 126 under the control of control electronics 36. Alternatively, the plunger 122 may be manipulated by a solenoid 128 which is connected by a linkage 130 to the plunger 122 as illustrated in FIG. 17. Although the linkage 130 is illustrated as exposed, it may also be encased within the same housing as the solenoid 128. FIGS. 16 and 17 are equivalent to the FIG. 1 implementation for the rectangular housed circuit breaker.

As illustrated in FIG. 18 and 19, the control electronics 36 may include the solid state relay 66 at the top or the bottom of the circuit breaker 110 respectively. The ground lead 52 is shown in FIG. 18 and the pair of terminals 106 are shown in FIG. 19 to provide external input to the control electronics 36. The terminals 106 may be of any approved type and may include a protective cover or may alterably be wires as in the ground lead shown. These two figures represent the equivalent of the schematic of FIGS. 5 and 15 respectively.

FIG. 20 illustrates the equivalent of FIG. 10 wherein a motor 78 under the control of control electronics 36 includes a conductive/insulative disc 82 between contacts 114 and 116 to provide a power management control of the contacts without moving the same. Although the conductive/insulative strip disc 82 is illustrated, the motor and cam method of FIG. 9 or the motor and optical system of FIG. 11 may also be incorporated into the circuit breaker 110. The control electronics of FIGS. 16-20 may include the interval timer of FIG. 12 or 13 or the demodulating circuit of FIG. 15.

Figure 21:
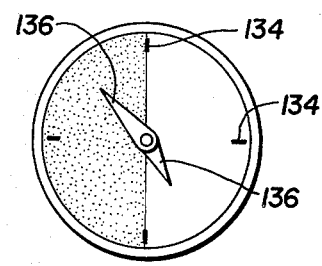
FIG. 21 is an indicator face for the circuit breaker of FIG. 20.

FIG. 21 illustrates a dial face having indicia 134 and hands 136. The location of the hands determine the on and off time relative to the indicia 134. This information is provided by appropriate means to the control electronics 36. This allows manual adjustment of the timing circuit of the control electronics as well as visual indication of the set points. A digital display may also be used with a generally cylindrical housing instead of the face illustrated in FIG. 21. Also, it should be noted that a FIG. 21 type display device may be used in the rectangular housing in lieu of the digital display.

If the control electronics 36 includes its own power source, its interconnection to the series circuit between terminals 24 and 26 of the rectangular circuit breaker or terminals 118 and 120 of the cylindrical circuit breaker is not relevant. But if it depends upon the AC power on the line terminal, the control electronics 36 must be connected to the input or line terminal. This provides continuous power of the electronic control circuit even if the circuit breaker should trip. The solid state relay 66 and the switch 50 is shown between the circuit breaker 44 and the load terminal. Although this is the preferred location, it may also be located between the circuit breaker and the line terminal.

It should be noted that the structure of FIGS. 18 and 19 with a solid state relay 66 in series with the circuit breaker contacts as well as the use of a simple switch 50 as illustrated in FIG. 3 in series with the circuit breaker contacts, may be used in a fuse housing, wherein a fusable element is substituted for the circuit breaker contacts. The fuse may include the internal timer of FIG. 12 or 13 or an external source wherein control signals are provided to the demodulator circuit of FIG. 15.

Figure 22:
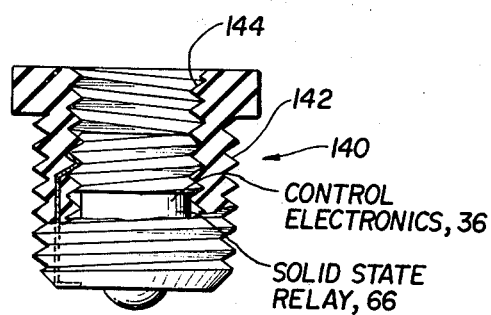
FIG. 22 is a cross-sectional view of a fuse adaptor according to the principles of the present invention.

To provide the control electronics 36 in a fuse with a series switch 50 or a solid state relay 66 would be quite expensive since the control electronics 36 and the other circuitry must be thrown away when the fusable element is destroyed. Thus, the present invention can be incorporated into a fuse adapter as illustrated in FIG. 22 as 140. This comprises a general cylindrical housing having an external threaded portion 142 to be received in a fuse socket of a circuit breaker panel and an internal threaded portion 44 to receive the external threads of a fuse. In the base of the adapter 140 is mounted the control electronics 36 and, for example, a solid state relay 66. The solid state relay 66 or a series switch 50, provides a series connection between the fuse and the load terminal of the fuse socket. If an overload should occur, and the fuse blows, it may be removed and thrown away and a new fuse inserted in the adapter 140. Thus, the adapter 140 provides the appropriate management functions of the resetable circuit breakers for a fuse circuit breaker. Adapters are presently available which enable a fustat to be inserted in a fuse socket.

From the preceeding description of the preferred embodiments, it is evident that the objects of the invention are attained in that a power manageable circuit breaker is provided that is easily installed without additional complexity or user knowledge. The invention has been described and illustrated in detail, it is to be clearly understood that the same is by way of illustration and example only and is not to be taken by way of limitation. The principles of the present invention have been shown to be applicable to rectangular as well as generally cylindrically housed circuit breakers as well as resettable and fuse circuit breakers. The control elctronics may be powered by internal DC as well as external DC and AC sources and may include an internal timer or be responsive to external signals received by wired or wireless means. The timer might use some non-electronic means or make use of newer technologies. The present invention describes the combination of a power management control circuit in a circuit breaker and is not to be restricted to any specific circuit breaker or control circuit embodiment. The spirit and scope being limited only by the terms of the appended claims.

What is claimed:

1. A power management and control device comprising:
   a rectangular housing having a pair of terminals accessible from the exterior of said housing for installation into a power panel as a normal circuit breaker;
   a circuit breaker in said housing having a pair of contacts connected in series with said terminals which open in response to current overload;
   actuator means in said housing for opening and closing said contacts; and
   electrical timer means in said housing for controlling said actuator means independent of current overload to open said contacts and automatically reclose said contacts after a period of time.

2. A power management and control device according to claim 1 wherein said timer means controls said actuator means to open said contact as a function of time.

3. A power management and control device according to claim 2 wherein said electrical timer means includes an integrated circuit and a battery power source.

4. A power management and control device according to claim 2 wherein said electrical timer means includes a terminal exterior to said housing for connecting said electrical timer means to ground and said timer means is also connected electrically to one of said circuit breaker terminals.

5. A power management and control device according to claim 1, wherein said actuator means includes a motor and a cam driven by said motor to open and close said contacts.

6. A power management and control device according to claim 1 wherein said actuator means includes an electromagnet means for opening and closing said contacts by a magnetic field.

7. A power management and control device according to claim 1 including adjustment means on said housing for adjusting a timer variable of said timer means.

8. A power management and control device according to claim 1 including indicating means on said housing for indicating timer variables.

9. A power management and control device comprising:
   a housing having external threads to be received in a threaded socket of a power panel;
   a circuit breaker in said housing having a pair of contacts which open in response to a current overload;
   actuator means in said housing for opening and closing said contacts; and
   electrical timer means in said housing for controlling said actuator means independent of current overload to open said contacts and automatically reclose said contacts after a period of time.

10. A power management and control device according to claim 9 wherein said timer means controls said actuator means to open said contact as a function of time.

11. A power management and control device according to claim 10 including a pair of external terminals connected in parallel to said timer means, said actuator means being responsive to timing signals from said timer means or provided to said external terminals.

12. A power management and control device according to claim 9 wherein said means includes a motor and a cam driven by said motor, said cam opens and closes said contacts.

13. A power management and control device according to claim 9 including adjustment means on said timer housing for adjusting a time variable of said means.

14. A power management and control device according to claim 9 including indicating means on said housing for indicating timer variables.

15. A power manageable circuit breaker comprising:
   a housing;
   a circuit breaker in said housing having a pair of contacts opening in response to a current overload and a manual operator extending from said housing for controlling said pair of contacts; and
   actuator means for manipulating said operator to open and close said contacts in response to a signal independent of current overload.

16. A power manageable circuit breaker according to claim 15 wherein said activator means includes a pair of opposed electro-magnetic plungers with said operator therebetween.

17. A power manageable circuit breaker according to claim 15 wherein said operator is a plunger.

18. A power manageable circuit breaker according to claim 17 wherein said plunger includes a magnetic section and said actuator means includes an inductor surrounding said magnetic section for manipulating said plunger.

19. A power manageable circuit breaker according to claim 17 wherein said actuator means includes a solenoid and a member interconnecting said solenoid and said plunger, said solenoid manipulating said plunger via said member.

20. A power manageable circuit breaker according to claim 15 wherein said actuator means is connected in series with said circuit breaker.

21. A power management and control device comprising:
- a housing:
- a circuit breaker in said housing having a pair of contacts opening in response to a current overload;
- cam means interposed between said pair of contacts, having conductive and non-conductive portions for electrically opening and closing said contacts; and
- actuator means in said housing for rotating said cam means to open and close said contacts in response to a signal independent of current overload.

22. A power management and control device according to claim 21 wherein the relationship of said conductive to non-conductive portions of said cam means defines time periods.

23. A power management and control device according to claim 21 wherein said actuator means includes a single cycle motor.

24. A power manageable circuit breaker comprising:
- a housing having a pair of terminals accessible from the exterior of said housing for installation into a power panel as a normal circuit breaker;
- a circuit breaker in said housing having a pair of contacts opening in response to a current overload;
- means in said housing for receiving a modulated signal and providing an activation signal; and
- timer means in said housing for opening and automatically reclosing said pair of contacts as a function of time in response to said activation signal.

25. A power manageable circuit breaker according to claim 24 wherein said timer means includes a motor and a cam driven by said motor to open and close said contacts.

26. A power manageable circuit breaker according to claim 24 wherein said timer means includes an electromagnet means for opening and closing said contacts by a magnetic field.

27. A power manageable circuit breaker according to claim 26 wherein said receiving means is connected in circuit with said circuit breaker for receiving said modulated signal from the power line circuit of said circuit breaker.

28. A power manageable circuit breaker according to claim 26 wherein said receiving means receives said modulated signal via wireless means.

29. A power manageable circuit breaker according to claim 28 wherein said wireless means includes an infrared receiver in said housing.

30. A power manageable circuit breaker according to claim 28 wherein said wireless means includes an RF receiver in said housing.

31. A power manageable circuit breaker according to claim 28 wherein said wireless means includes an ultrasonic receiver in said housing.

32. A power manageable circuit breaker according to claim 28 wherein said wireless means includes a subsonic receiver in said housing.

33. A power manageable circuit breaker according to claim 24 wherein said timer means has a predetermined timing cycle which is triggered by said activation signal.

34. A power manageable circuit breaker according to claim 33 including adjustment means on said housing for adjusting timer variables.

35. A power manageable circuit breaker according to claim 33 including indicating means on said housing for indicating timer variables.

36. A power manageable circuit breaker comprising:
- a housing having external threads to be received in a threaded socket of a power panel;
- a circuit breaker in said housing having a pair of contacts opening in response to a current overload through said circuit breaker;
- a switching means in said housing and connected in series with said circuit breaker; and
- control means in said housing for deactivating and automatically reactivating after a period of time said switching means to provide an open and subsequent close circuit independent of current overload.

37. A power manageable circuit breaker according to claim 36 wherein said control means includes means in said housing for receiving a modulated signal and activating and deactivating said switching means in response to said modulated signal.

38. A power manageable circuit breaker according to claim 37 wherein said receiving means is connected in circuit with said circuit breaker for receiving said modulated signal from the power line circuit of said circuit breaker.

39. A power manageable circuit breaker according to claim 36 wherein said switching means includes an electronic-optical receiver and said control means includes an electronic-optical transmitter, said electronic optical receiver and transmitter functionally interconnect and electrically isolate said switching means and said control means.

40. A power management and control device according to claim 36 wherein said switching means includes an electronic-optical receiver and said timer means includes an electronic-optical transmitter, said electronic optical receiver and transmitter functionally interconnect and electrically isolate said switching means and said timer means.

41. A power management and control device according to claim 40 wherein said timer means is connected between the power line terminal of said circuit breaker and a ground terminal.

42. A power management and control device according to claim 36 wherein said switching means and said timer means are electronic circuits formed as an integrated circuit.

43. A power management and control device according to claim 36 wherein said switching means includes a pair of contacts and said timer means includes an actuator means for opening and closing said contacts.

44. A power management and control device according to claim 43 wherein said actuator means includes a motor and a cam driven by said motor to open and close said contacts.

45. A power management and control device according to claim 43 wherein said actuator means includes an electromagnet means for opening and closing said contacts by a magnetic field.

46. A power management and control device according to claim 36 wherein said timing means include a battery power source.

47. A power management and control device according to claim 36 including means on said housing for adjusting said timer means.

48. A power management and control device according to claim 36 including means on said housing for indicating timer variables.

49. A power management and control device comprising:

a rectangular housing having a pair of terminals accessible from the exterior of said housing for installation into a power panel as a normal circuit breaker;

a circuit breaker in said housing having a pair of contacts connected in series with said terminals which open in response to current overload;

switching means in said housing connected in series with said circuit breaker; and timer means in said housing for deactivating and automatically reactivating said switching means as a function of time and independent of current overload to provide an open and a subsequent close circuit.

* * * * *